(12) United States Patent
Owechko

(10) Patent No.: US 10,268,914 B1
(45) Date of Patent: Apr. 23, 2019

(54) BLIND SENSING FOR HYPERSPECTRAL SURVEILLANCE

(71) Applicant: HRL Laboratories, LLC, Malibu, CA (US)

(72) Inventor: Yuri Owechko, Newbury Park, CA (US)

(73) Assignee: HRL Laboratories, LLC, Malibu, CA (US)

(*) Notice: Subject to any disclaimer, the term of this patent is extended or adjusted under 35 U.S.C. 154(b) by 72 days.

(21) Appl. No.: 15/402,159

(22) Filed: Jan. 9, 2017

Related U.S. Application Data

(60) Provisional application No. 62/275,958, filed on Jan. 7, 2016.

(51) Int. Cl.
| | |
|---|---|
| *G06K 9/00* | (2006.01) |
| *G06K 9/20* | (2006.01) |
| *G01J 3/28* | (2006.01) |
| *H04N 5/232* | (2006.01) |
| *G06K 9/32* | (2006.01) |
| *G06K 9/46* | (2006.01) |
| *G06K 9/62* | (2006.01) |

(52) U.S. Cl.
CPC ............ *G06K 9/209* (2013.01); *G01J 3/2823* (2013.01); *G06K 9/00771* (2013.01); *G06K 9/3233* (2013.01); *G06K 9/4652* (2013.01); *G06K 9/628* (2013.01); *G06K 9/6269* (2013.01); *G06K 9/6274* (2013.01); *H04N 5/23296* (2013.01); *G01J 2003/2826* (2013.01); *G06K 2009/4657* (2013.01)

(58) Field of Classification Search
CPC .... G06K 9/209; G06K 9/4652; G06K 9/6274; G06K 9/6269; G06K 9/628; G06K 9/3233; G06K 9/00771; G06K 2009/4657; G01J 3/2823; G01J 2003/2826; H04N 5/23296
See application file for complete search history.

(56) References Cited

U.S. PATENT DOCUMENTS

| | | | |
|---|---|---|---|
| 8,761,506 B1 * | 6/2014 | Padwick | G06K 9/0063 |
| | | | 382/167 |
| 9,299,010 B2 * | 3/2016 | Sathyendra | G06K 9/6267 |
| (Continued) | | | |

OTHER PUBLICATIONS

Xia et al, "Independent Component Analysis for Blind Unmixing of Hyperspectral Imagery With Additional Constraints", IEEE Transactions on Geoscience and Remote Sensing, vol. 49, No. 6, Jun. 2011.*

(Continued)

*Primary Examiner* — Tom Y Lu
(74) *Attorney, Agent, or Firm* — Tope-McKay & Associates

(57) ABSTRACT

Described is a blind sensing system for hyperspectral surveillance. During operation, hyperspectral data is captured using a hyperspectral camera as mounted on a mobile platform. The system then forms a signal mixture of a plurality of multi-dimensional signals. The multi-dimensional signals being the captured hyperspectral data of a wide area having a background and an object. The plurality of multi-dimensional signals are then demixed using blind source separation, resulting in separated spectra. Finally, the system detects and recognizes a spectral signature of the object in the separated spectra.

27 Claims, 10 Drawing Sheets

(56) References Cited

U.S. PATENT DOCUMENTS

2016/0313184 A1* 10/2016 Owechko .............. G01J 3/2823
2016/0328838 A1* 11/2016 Kwan .................. G06K 9/0063

OTHER PUBLICATIONS

Comon, Pierre (1994): "Independent Component Analysis: a new concept?", Signal Processing, 36(3): pp. 287-314.
Hyvärinen, A.; Oja, E. (2000): "Independent Component Analysis: Algorithms and Application", Neural Networks, 13(4-5): pp. 411-430.
José M. Bioucas-Dias, et al., "Hyperspectral Unmixing Overview: Geometrical, Statistical, and Sparse Regression-Based Approaches," IEEE Journal of Selected Topics in Applied Earth Observations and Remote Sensing, vol. 5, No. 2, Apr. 2012, pp. 354-379.
Wing-Kin Ma, et al., "A Signal Processing Perspective on Hyperspectral Unmixing," IEEE Signal Processing Magazine, Jan. 2014, pp. 67-81.
Marian-Daniel Iordache, et al., "Sparse Unmixing of Hyperspectral Data," IEEE Transactions on Geoscience and Remote Sensing, vol. 49, No. 6, Jun. 2011, pp. 2014-2039.

* cited by examiner

BLIND SENSING FOR HYPERSPECTRAL SURVEILLANCE

CROSS-REFERENCE TO RELATED APPLICATIONS

This is a non-provisional patent application of U.S. Provisional Application Ser. No. 62/275,958, filed on Jan. 7, 2016, the entirety of which is hereby incorporated by reference.

BACKGROUND OF INVENTION (1) Field of Invention

The present invention relates to sensing frameworks for surveillance and, more specifically, to a "blind" sensing system for surveillance that automatically separates signals from clutter for subsequent classification using statistical independence without prior knowledge of the signals.

(2) Description of Related Art

Many existing platforms must perform signal analysis and recognition tasks in challenging environments where signals of interest can be weak and buried in strong background clutter and interference, For example, it is often difficult for automotive radars to separate objects of interest from strong clutter, or track many objects at once, due to the limited number of emitting and receiving elements. Similarly, in electronic warfare adversary signals are often weak, spread out in frequency, and occupy the same frequency-time locations as other stronger signals. Further, within the field of maritime surveillance, a common method for extracting signals from clutter involves using prior knowledge to perform filtering before signal detection and recognition. One disadvantage of current methods is that they cannot easily handle signals overlapping in space and wavelength. Yet another disadvantage of these methods lies in their inability to separate new signals from clutter that has never been seen before.

Another method for extracting signals from clutter involves angle of arrival separation using phased array antennas for applications in the radio frequency (RE) domain. With this method, however, signal and clutter often overlap in angle as well. Yet another disadvantage to this method lies in the fact that even when the signal and method are separable in angle, steerable phased arrays are expensive and heavy compared to single element sensors.

In another related method, waveform coding is often used by automotive radars to separate signal from clutter, A disadvantage to waveform coding lies in the fact that performance can degrade in dense environments with many objects.

Blind source separation (hereinafter BSS) is another technique for signal detection. Although several BSS approaches have been developed within the prior art, each one of these uses the same or dependent signal dimensions for both separating the signals and analyzing them. One existing family of approaches for BSS is independent component analysis (hereinafter ICA). In ICA, different mixtures of signals are formed during the measurement process. For example, multiple microphones may record mixtures of voices in different ratios based on their locations. The mixtures are then processed using algorithms that maximize the statistical independence of the separated signals. In the case of one-dimensional signals, such as audio or EEG signals, both time domain and frequency domain ICA has been demonstrated. Frequency domain ICA has been used to separate convolutive mixtures in which the mixtures contain signals delayed by various amounts. In these cases the two domains are not independent because of frequency and time are conjugate variables, a consequence of the one-dimensional nature of the signals. The sparsity of signals has also been used for BSS using a single sensor, but many signals of interest are not sparse and the best basis set for sparsity can vary greatly for different signals.

With respect to demixing hyperspectral signals, existing hyperspectral ICA demixing methods are based on treating the hyperspectral data cube as a set of images with one image per spectral band. Therefore, it has been natural to approach hyperspectral ICA analysis as a straight extension of ICA analysis of conventional images, which leads to mixing and demixing in the same signal dimensions. While functional for signal separation, such existing processes are slow and inefficient, especially when some signal components are much stronger than others.

Thus, a continuing need exists for a sensing system that separates and classifies signals, including multi-dimensional data, while improving upon speed and computational efficiency.

SUMMARY OF INVENTION

Described is a blind sensing system for hyperspectral surveillance. The system includes one or more processors and a memory. The memory is a non-transitory computer-readable medium having executable instructions encoded thereon, such that upon execution of the instructions, the one or more processors perform several operations. During operation, hyperspectral data is captured using a hyperspectral camera as mounted on a mobile platform (e.g., a push-broom hyperspectral camera). The system then forms a signal mixture of a plurality of multi-dimensional signals using a subset of dimensions within the multi-dimensional signals. The multi-dimensional signals being hyperspectral data of a wide area having a background and an object and the subset of dimensions being mixing dimensions. The plurality of multi-dimensional signals are demixed using blind source separation in dimensions orthogonal (i.e., different) from the mixing dimensions, resulting, in separated spectra. A spectral signature of the object is then detected and recognized in the separated spectra in dimensions orthogonal from the mixing dimensions.

In another aspect, the system tracks object.

In yet another aspect, in forming the signal mixture, hyperspectral data from a plurality of overlapping sliding windows are integrated.

In another aspect, the plurality of overlapping sliding windows are slid in space and time.

Further, demixing, the plurality of multi-dimensional signals is performed using independent component analysis.

In yet another aspect, the plurality of overlapping sliding windows are formed using nadir or side-looking views from forward motion of a push-broom hyperspectral camera mounted on a mobile platform.

In another aspect, detecting and recognizing the spectral signature of the object in the separated spectra is performed using a technique selected from a group consisting of nearest neighbor classification, support vector machine classification, neural network classification, and decision tree classification, or any other classification technique.

Further, the detected spectral signature of the object provides a cue to cause the system further perform an operation of zooming in on the object with a camera that operates in the mixing dimension.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
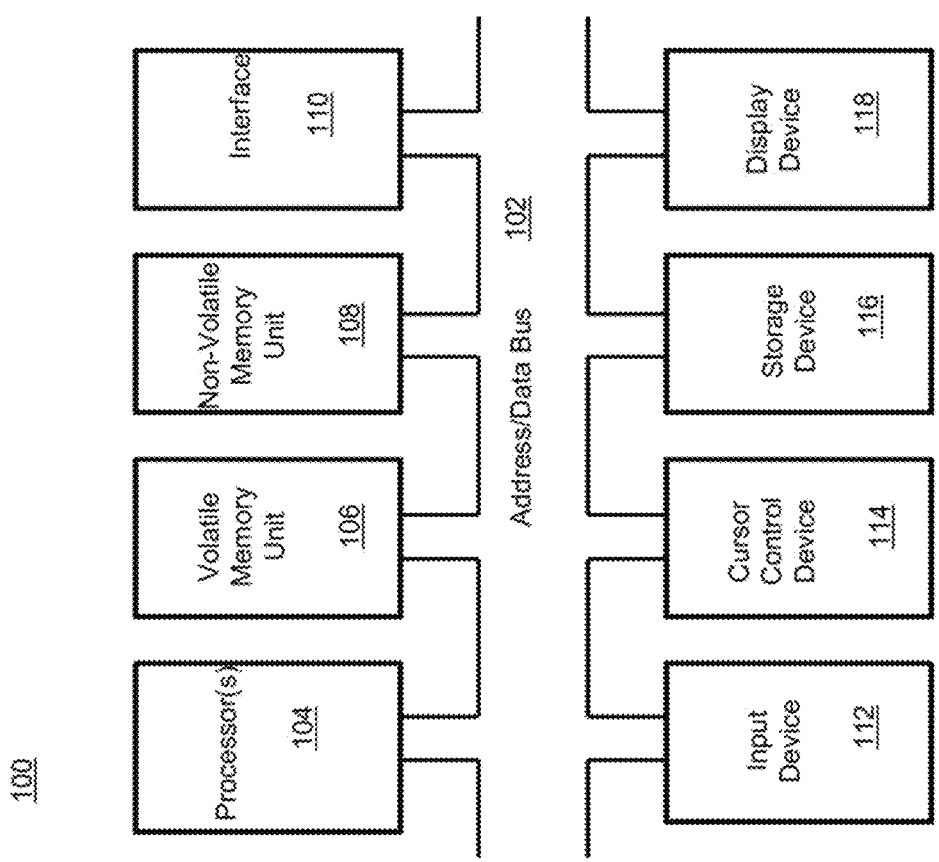
FIG. 1 is a block diagram depicting the components of a system according to various embodiments of the present invention.

The present invention relates to sensing frameworks for surveillance and, more specifically, to a "blind" sensing system for surveillance that automatically separates signals from clutter for subsequent classification using statistical independence without prior knowledge of the signals. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail., first a description of the various principal aspects of the present invention is provided. Subsequently, an introduction provides the reader with a general understanding of the present invention. Finally, specific details of various embodiment of the present invention are provided to give an understanding of the specific aspects.

(1) Principal Aspects

Various embodiments of the invention include three "principal" aspects. The first of these is a "blind" sensing framework for surveillance that automatically separates signals from clutter for subsequent classification using statistical independence without prior knowledge of the signals. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer), The third principal aspect is a computer program product. The computer program product generally represents computer-readable instructions stored on a non-transitory computer-readable medium such as an optical storage device, e.g., a compact. disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed b one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. in an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as, a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using, computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
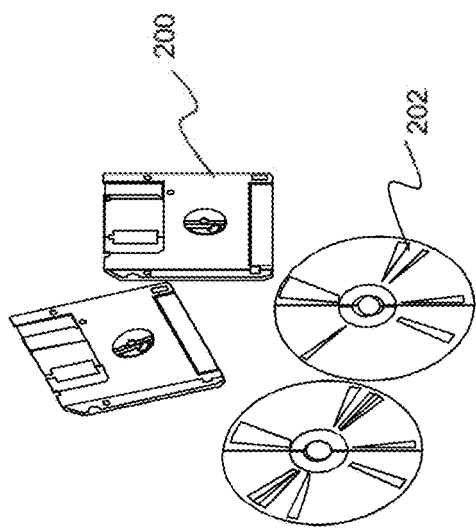
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Introduction

This disclosure provides a new "blind" sensing framework for surveillance that automatically separates signals from clutter tier subsequent classification using statistical independence without prior knowledge of the signals. The operative insight of the present invention is that, unlike existing blind source separation methods, multidimensional signals can be separated from background clutter by measuring mixtures of signals in one set of dimensions while performing demixing and exploitation in other independent dimensions. For example, this method can be applied to maritime surveillance using an aerial hyperspectral camera, which generates four-dimensional data consisting of two spatial dimensions, optical wavelength, and time. Accordingly, the present invention is implemented by measuring different mixtures using the space and time dimensions while the demixing and exploitation is performed in the wavelength dimension. Performing the mixing and demixing operations in different independent dimensions is unique. It allows for the sacrifice of resolution in one dimension to form mixtures for signal extraction, while preserving high resolution in an orthogonal dimension for blind separation using statistical independence measures. The same or other high resolution dimensions can then be used for detection and recognition. In addition, it enables the performance of blind source separation using a single sensor, unlike most BSS methods that require arrays of sensors, and without requiring the signals to be sparse (as is the case for other single sensor BSS methods). The system described herein can also be used with existing hyperspectral cameras and does not require new hardware development. The present invention has demonstrated good detection with rejection of clutter that is greater than 100 times stronger than the signal in an example maritime surveillance scenario using NASA hyperspectral flight data.

By using different independent dimensions for forming mixtures and analyzing them, the method of the present invention enables mixing and analysis to be optimized independently for much more efficient hyperspectral sensing of wide areas. A unique aspect is to use signal dimensions for forming the mixtures that are different and independent from the dimensions used for demixing, detection, and recognition. For example, by mixing in time and space and demixing in the spectral dimension, the number of ICA components is equal to the number of different signals, not the number of spectral bands as in previous ICA hyperspectral analysis methods. This greatly increases the speed of the demixing process. It also allows the system to use the time dimension to greatly increase the footprint of a pixel on the ocean or ground and still detect an object that is much smaller than the pixel footprint, which enables an increase in the wide area coverage rate by greater than 100 times compared to pixel limited conventional imaging methods.

Many existing platforms must perform signal analysis and recognition tasks in challenging environments where signals of interest can be weak and buried in strong background clutter and interference. Thus, a need exists for a new signal processing framework for both passive and active sensing that can exploit new information measures, such as the relative independence of signals. The blind sensing framework of the present invention will greatly increase the capabilities of many platforms to perceive, navigate, and perform surveillance in challenging radar and RF sensing environments with high interference and clutter. It can also be used with existing sensors and does not require multiple sensors.

Blind sensing can be used in a variety of applications. For example, blind sensing is especially well-suited for wide area maritime surveillance using manned platforms, unmanned aerial vehicles (UAVs), or satellites. By separating signals from background clutter, blind sensing enables detection of small maritime objects that are much smaller than the area covered by a hyperspectral pixel. This makes large pixel footprints practical for reliable detection which dramatically increases the wide area surveillance of the system over existing technologies.

(3) Specific Details of Various Embodiments

Figure 3:
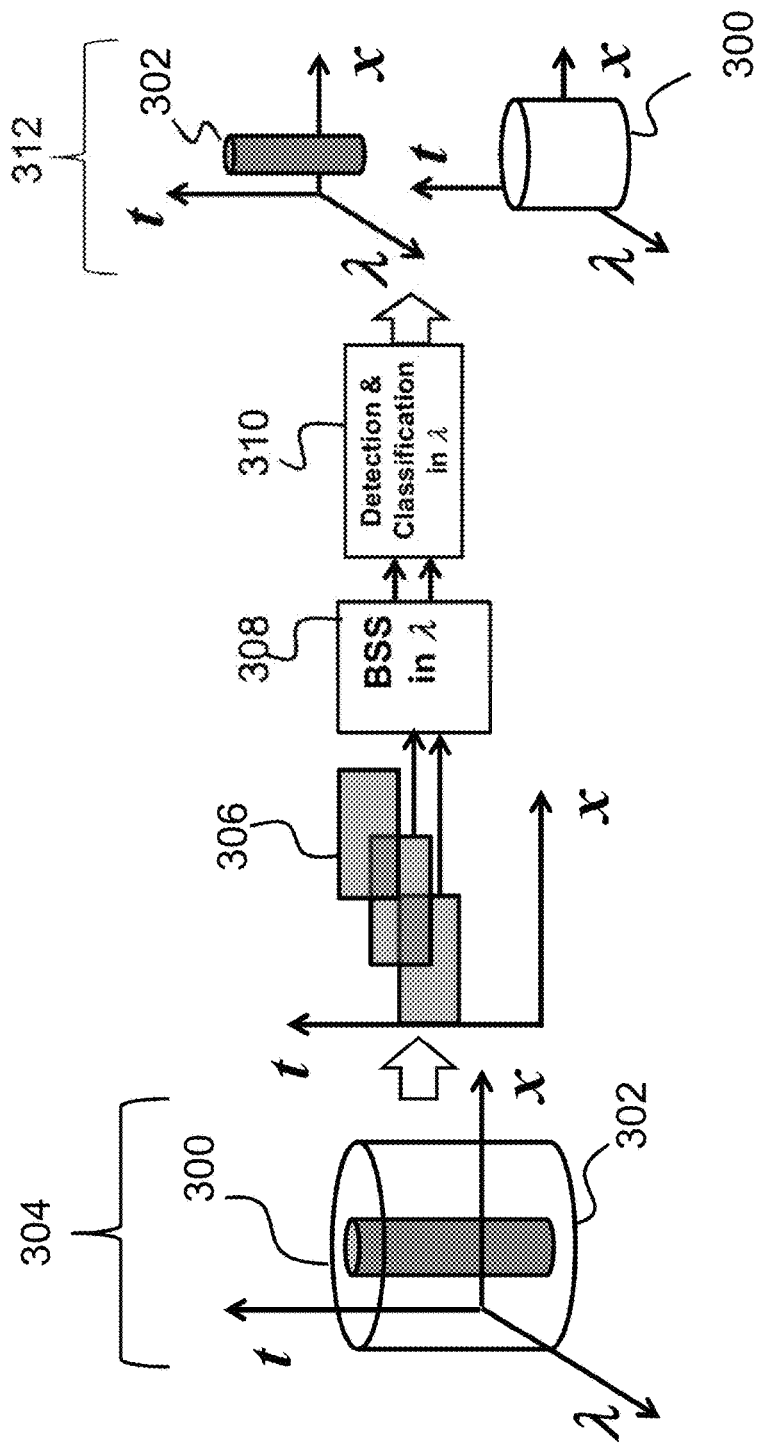
FIG. 3 is an illustration of a blind sensing framework according to various embodiments of the present invention.

As noted above, this disclosure provides a blind sensing system for hyperspectral surveillance for signal classification. The processing flow for the blind sensing signal processing framework of the present invention is shown in FIG. 3. The objective of the framework is to perform blind source separation (BSS) to separate signals from other overlapping signals and background interference without using prior knowledge of the signals and without using multiple sensors. The separated signals can then be subsequently analyzed.

Many signals of interest have high dimensionality; for example, hyperspectral imaging signals are four dimensional (two spatial dimensions, time, and spectral wavelength), These dimensions are independent, in other words variations in one dimension are not necessarily correlated with other dimensions as they are in conjugate dimensions. A unique aspect of the system of this disclosure is to use a subset of the dimensions for forming mixtures of the full-dimensional signals and then use dimensions that are orthogonal to the mixing dimensions for demixing and recognition of the component signals. This allows the system to sacrifice resolution in the mixing dimensions in order to form the mixtures using a single sensor while maintaining high resolution in the dimensions used for signal detection and analysis.

The basic blind sensing framework is shown in FIG. 3 for three-dimensional (3D) hyperspectral signals with space, time, and wavelength dimensions. For ease of illustration, only one spatial dimension is shown. In the present application, hyperspectral imaging data is used as an example of a multi-dimensional signal, but the framework is general and could be applied to other multi-dimensional signals as well. Two signals 300 and 302 are shown in the multi-dimensional space 304 that overlap with different relative amounts of each signal in different locations. In the conventional ICA demixing approach, each spectral wavelength band is treated as a mixture of signals, and the demixing is also performed in the spectral dimension. The number of mixtures is large, because in order to cover the full spectral range, all of the spectral bands must be demixed. Alternatively, in the approach of this disclosure, demixing is also performed in the spectral dimension, but the mixtures are formed in the orthogonal time and space dimensions using a sliding window 306 (i.e., sliding window in space x and time t) that corresponds to a camera pixel's footprint on the ground or water. For example, the mixtures are formed using a single sensor by integrating over the sliding window in the space and time dimensions. The sensor is any suitable sensor operable for capturing hyperspectral data, a non-limiting example of which includes a push-broom hyperspectral camera. The number of required mixtures need to only be equal to or greater than the number of expected signals.

In order to generate the mixtures, at each sampling time a window (pixel) is slid spatially so that it partially overlaps the previous window position. The mixture values are measured by integrating the signals over the spatial extent of each window, as occurs naturally for camera pixels. As the window slides in space and time, different ratios of the signals contribute to each mixture measurement. Each measurement is a measurement of the composite spectrum of the materials covered by the sliding window but the mixtures are formed in space and time. In FIG. 3, two positions of the window are used to generate two mixtures of spectra that are then demixed 308 using a conventional blind source separation (BSS) algorithm such as independent component analysis (ICA). Examples of the ICA process can be found in Comon, Pierre (1994), "Independent Component Analysis: a new concept?", *Signal Processing*, 36(3):287-314, and also in Hyvärinen, Oja, E. (2000), "Independent Component Analysis: Algorithms and Application", *Neural Networks*, 13(4-5):411-430, both references of which are incorporated by reference as though fully set forth herein.

Since the mixtures are formed in space and time, the sliding window integration does not affect the spectral resolution of the signals. The separated spectra can then be detected and classified 310 using the wavelengths based on conventional methods, such as nearest neighbor classification, support vector machine classification, neural network classification, or decision tree classification, etc. Once separated, the separated overlapping signals 300 and 302 can be further tracked 312 in all dimensions using known signal tracking methods, such as Kalman or particle filter tracking (e.g., Jepson, A. D., Fleet. D. J. and El-Maraghi, T. (2003) Robust, on-line appearance models for visual tracking. IEEE Trans. on PAMI, 25(10):1296-1311), the entirety of which is incorporated herein by reference.

Figure 4:
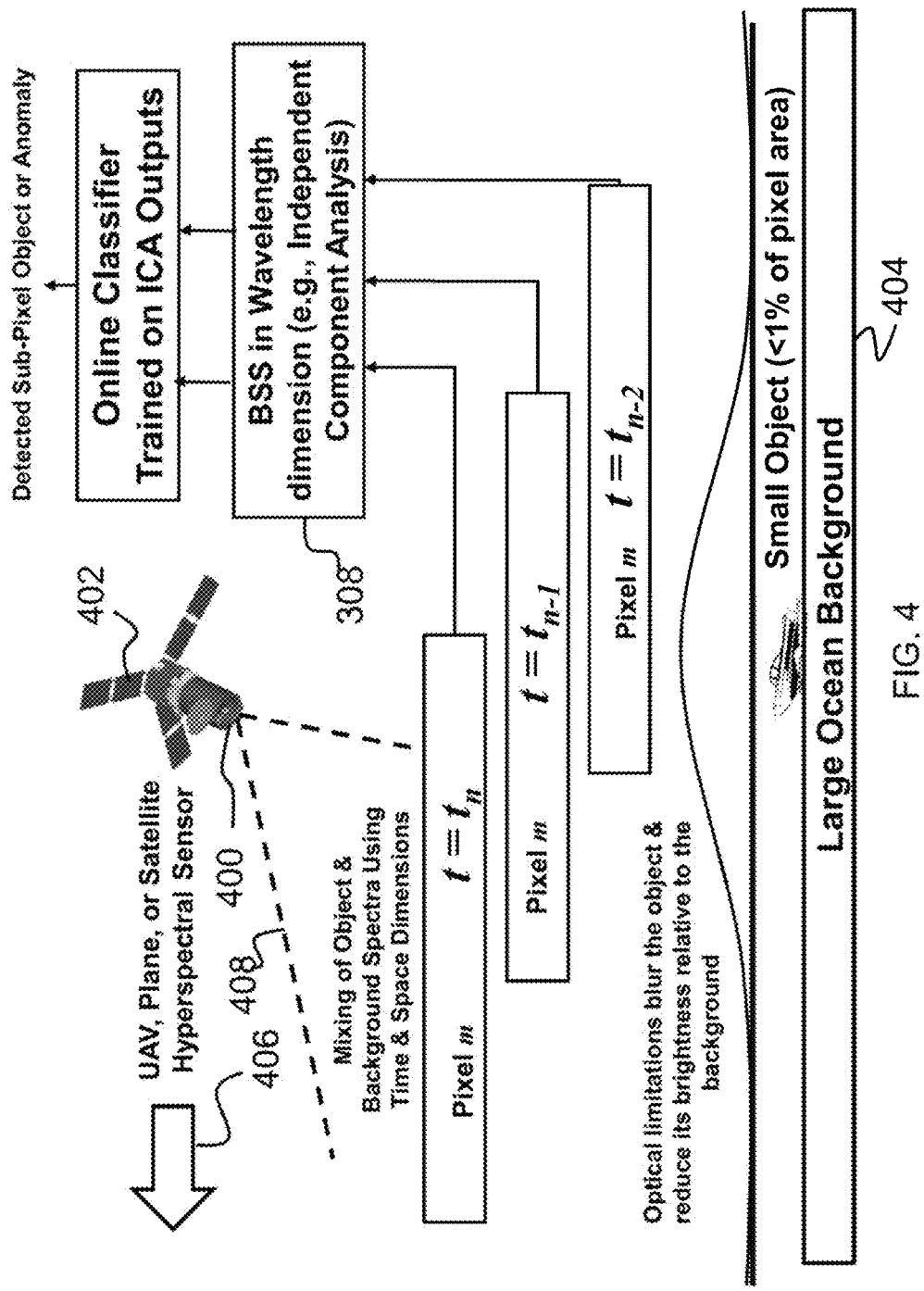
FIG. 4 is an illustration of an example implementations of hyperspectral blind sensing for wide-area maritime surveillance for nadir view geometry according to various embodiments of the present invention.
Figure 5:
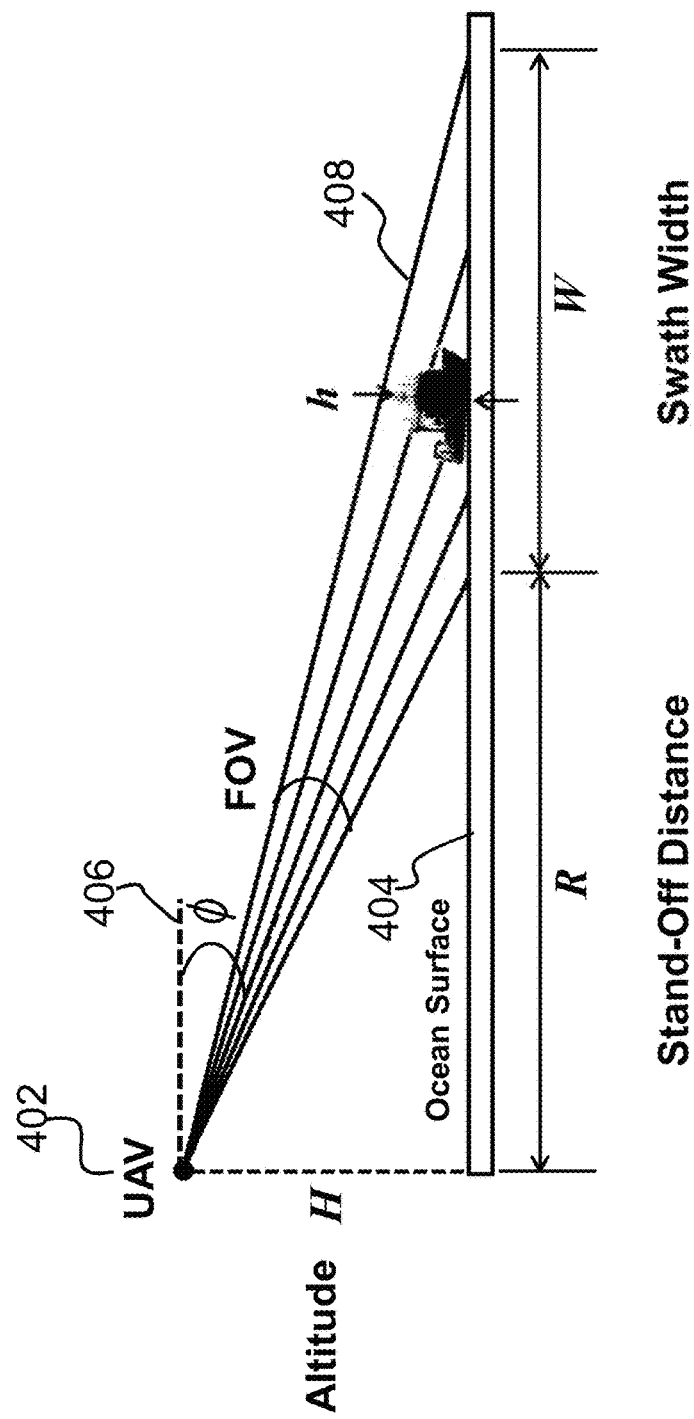
FIG. 5 is an illustration of an example implementations of hyperspectral blind sensing for wide-area maritime surveillance for side-looking geometries according to various embodiments of the present invention.

Two example implementations of the hyperspectral blind sensing system for wide-area surveillance (e.g., maritime surveillance) for nadir and side looking geometries are shown in FIGS. 4 and 5, respectively. The nadir view, as shown in FIG. 4, refers to, for example, downward-facing viewing geometry of an orbiting satellite or UAV. In both geometries as depicted in FIGS. 4 and 5, a pushbroom type of hyperspectral sensor 400 is mounted on an aerial or space platform 402. The pushbroom sensor 400 images 408 a narrow line or swath on the ocean 404 that is perpendicular to the motion vector 406 of the platform 402. A grating is used to generate the spectrum of each spatial pixel in the swath in the orthogonal dimension on a two-dimensional (2D) detector array.

Figure 6:
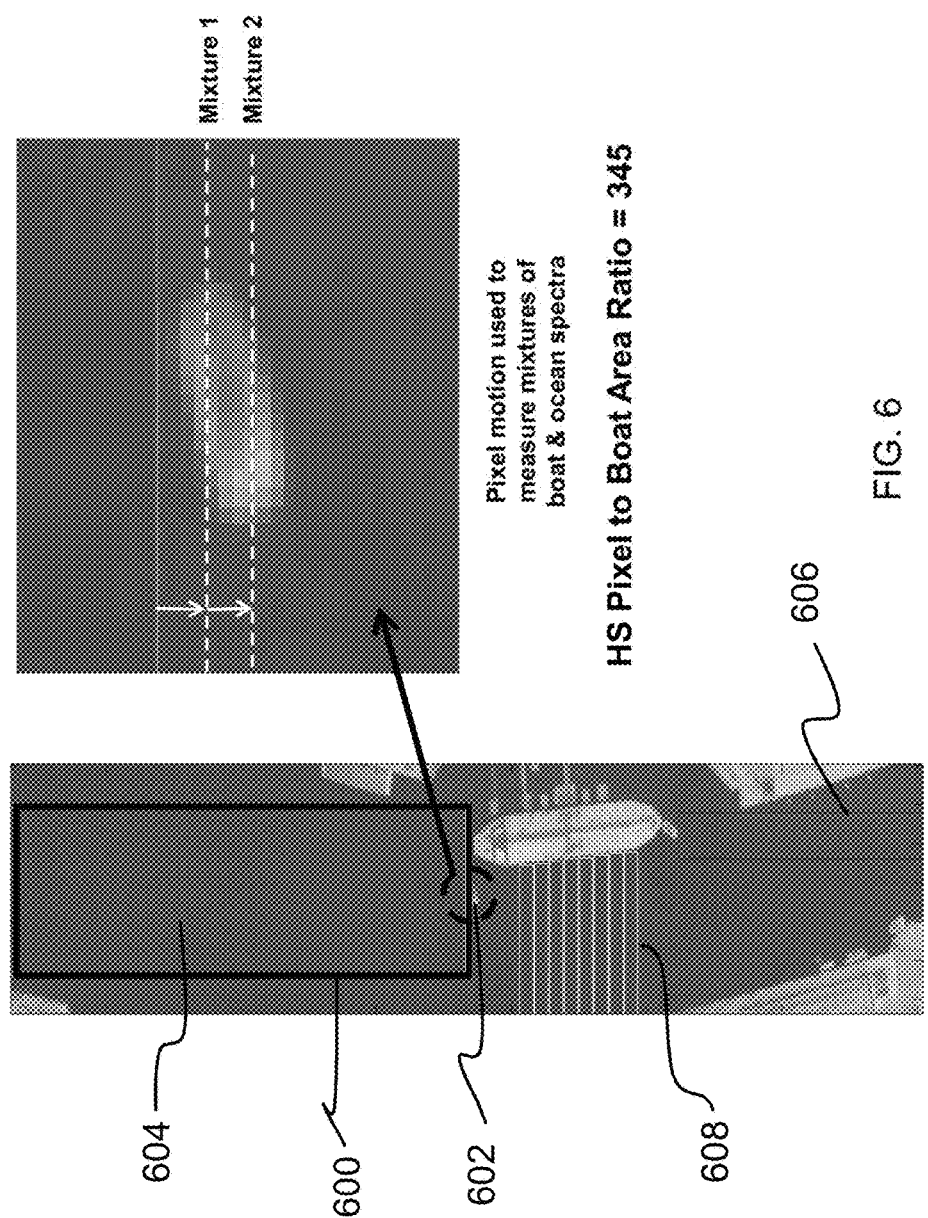
FIG. 6 is an illustration of a sample dataset used to generate blind sensing detection and classification results.

In the example image of FIG. 6, one pixel 600 is shown in the swath as the forward motion of the platform forms sliding overlapping windows that are integrated to form the output of the pixel at each sampling time. A small boat object 602 on the ocean background 604 is also shown. The object 602 is much smaller than the pixel 600 footprint, so the object's signal will he blurred or spread out over a region comparable to the pixel 600 footprint or window size. Each pixel's 600 footprint can be much larger than the boat or target because it is detected using spectral, not spatial, information. This greatly increases the area coverage rate.

As the platform moves, different relative amounts of the object 602 and background 604 will be mixed together in the pixel 600 at different times. These different ratios apply equally to the spectra of the object 602 and background 604, which permits the performance of the demixing process (e.g., ICA) on the spectra of the mixtures in order to separate the object 602 and background 604 spectra. Referring again to FIGS. 3 and 4, since demixing 308 (e.g., ICA) can separate signals even if the relative strength of some signals are small relative to others (limited by the noise in the measurements), small objects with small signals can be detected against a large background signal even if they overlap in space, time, and wavelength by maximizing the statistical independence of the demixed signals. This allows sub-pixel detection, classification, and tracking of objects over a wide area very efficiently using existing pushbroom hyperspectral cameras. The accuracy of detection is determined by the high resolution spectral dimension, while localization in space and time is limited by the lower resolution in these dimensions since they are used for forming mixtures. However, the detection of a sub-pixel sized object using its spectrum can be used as a cue for another camera that can then zoom in on the pixel footprint to verify the object using its spatial appearance. For example, in various embodiments, once a detected spectral signature is recognized (which can be a cue for further analysis), the system can then be designed to provide for closer examination with a higher resolution camera that operates in the mixing dimension.

Blind sensing performs best when the signal spectra are stationary over the spatial extent used to form the mixtures for each ICA demixing 308 operation. In other words, for maritime surveillance, the spectrum of the ocean should be uniform over the window integration period. The system can however adapt to variability on scales larger than a pixel region. If the spectra change during the integration period then the optical mixtures will not meet the condition of having the same spectral components but in different amounts. ICA will then not be able to separate the mixtures if the changes are too big. In practice, the system would tolerate small changes but the performance will decrease as the changes become bigger.

In order to obtain good detection and classification, it is not necessary for the ICA demixing 308 to be perfect, so long as it is consistent. It has been found that for some signals, the ICA demixed components can be different from the input spectra, but are consistently generated so that they can still be used as repeatable signatures for recognition, Training the classifier using the ICA outputs assists the classifier to compensate for imperfect demixing.

The system described herein was constructed and tested to demonstrate the effectiveness the system. While the system can be employed on active or real-time mobile platforms (e.g., UAV, airplane, satellite, etc.), the system was tested to demonstrate blind sensing for surveillance using the publically available HyTES LWIR airborne hyperspectral dataset collected by National Aeronautics and Space Administration (NASA). The dataset consists of 256 wavelength channels in the long wave infrared (IR) spectrum with 512 pixels in each cross-track swath. The dataset was collected over Long Beach Harbor and includes measurements at every spatial pixel using a pushbroom-type sensor. The dataset included two small boats and two large cargo vessels. Integration was performed over the spatial regions shown in FIG. 6 to form the spatial mixtures (e.g., mixture 1 and mixture 2) using large pixel 600 footprints. The mixtures were formed by sliding the edge of a large sliding window (i.e., pixel 600 window) over a boat or section of a cargo vessel. Different positions of the sliding window generated different mixtures of boat and water spectra that were then used for ICA demixing, The large sliding window (i.e., pixel 600 window) used for detecting the test set boat had an area 345× larger than the boat, The training set boat prototype spectrum was measured by sliding the smaller window 606 over the lower boat. This prototype was used as the prototype for classifying both the test set boat and the two test set ships. The water prototype spectrum was also measured using the smaller window 606, but without the boat in it. This resulted in a training set consisting of one boat and one water area of the harbor. Additional windows 608 were then used to collect the test set by sliding them over the other boat and over sections of the two cargo ships. The test set boat window area had a water to boat area ratio of 345 while the cargo ship windows had a water to boat area ratio of 100.

Figures 7A, 7B, 7C:
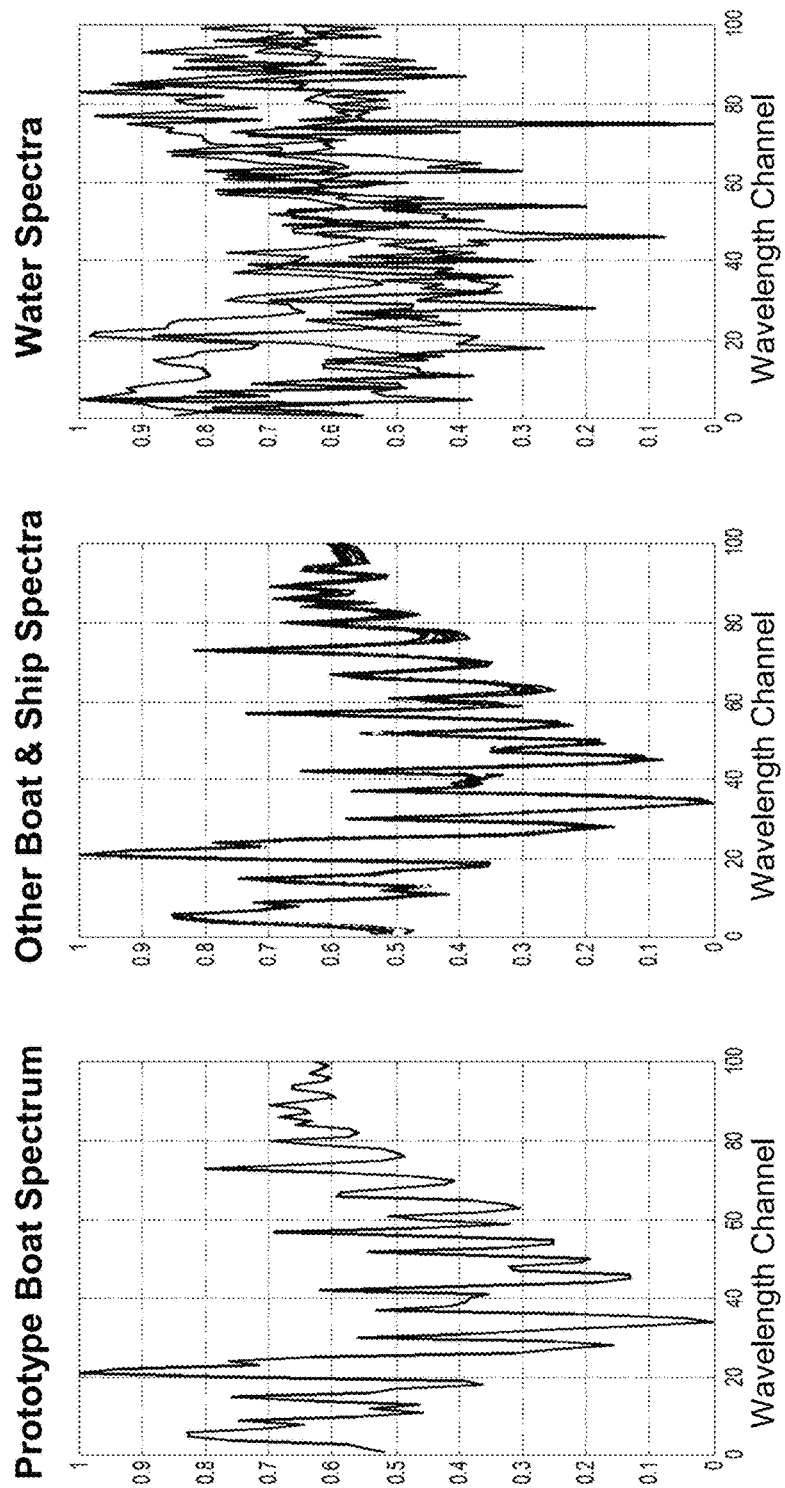
FIG. 7A is an illustration of a prototype boat spectra from hyperspectral pixels using blind sensing according to various embodiments of the present invention.
FIG. 7B is an illustration of boat and ship spectra from hyperspectral pixels using blind sensing according to various embodiments of the present invention.
FIG. 7C is an illustration of a water spectra from hyperspectral pixels using blind sensing according to various embodiments of die present invention.

The spectrum of the prototype boat in the training set after ICA demixing of the large pixel window is shown in FIG. 7A. The spectra of other demixed boat and ship signals in the test set are shown in FIG. 7B and the demixed test set water spectra are shown in FIG. 7C. The ICA demixed outputs for boats are repeatable spectral signatures that can be easily distinguished from demixed water spectra. In other words, the targets (such as boats) have repeatable spectral ICA signatures that can be easily distinguished from the background (e.g., water).

Figures 8A, 8B, 8C:
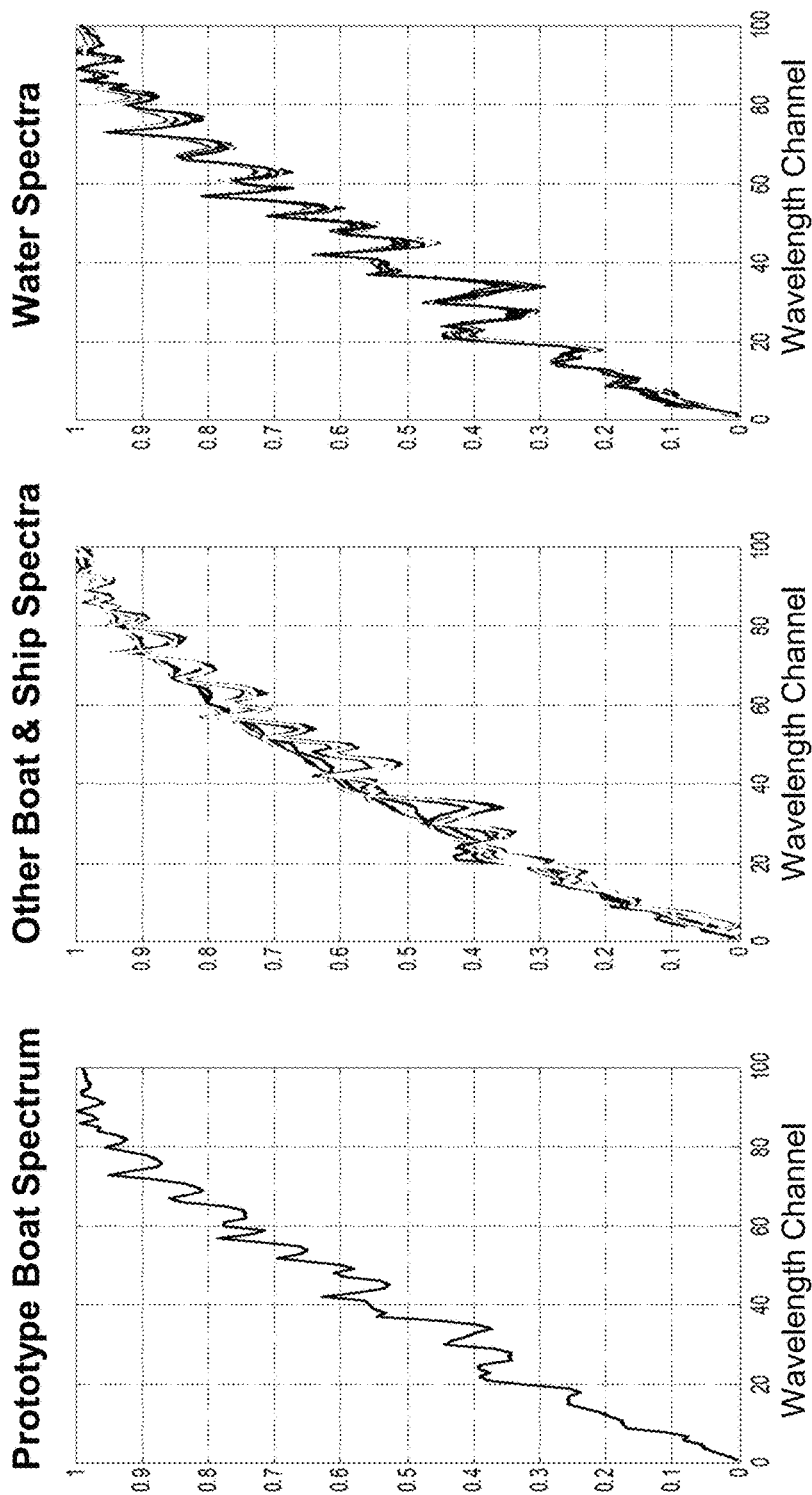
FIG. 8A is an illustration of a prototype boat spectra from hyperspectral pixels used by conventional sensing without ICA demixing.
FIG. 8B is an illustration of boat and ship spectra from hyperspectral pixels used by conventional sensing without ICA demixing.
FIG. 8C is an illustration of a water spectra from hyperspectral pixels used by conventional sensing without ICA demixing.

The pixel spectra without ICA processing are shown in FIGS. 8A through 8C. The boat and ship spectra (as shown in FIG. 8B) cannot be visually distinguished from the pure water spectra (as shown in FIG. 8C) because the mixture spectra are dominated by the water signal due to the small relative sizes of the boat and ship segments relative to the water area. The ship spectrum cannot be seen because it is overwhelmed by the large water signal.

Figure 9B:
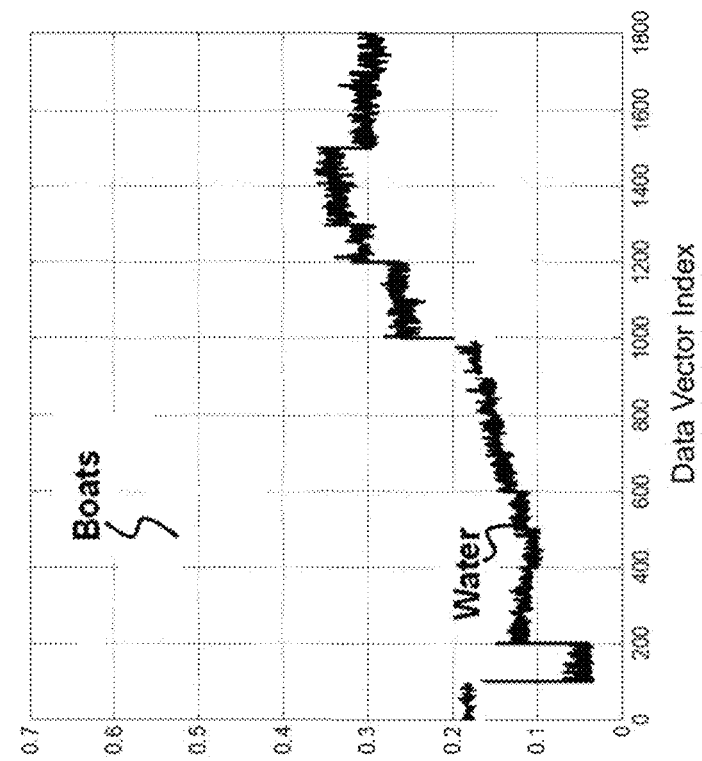
FIG. 9B is an illustration of a comparison of classification for water and boat data vectors using conventional sensing without demixing.
Figure 9A:
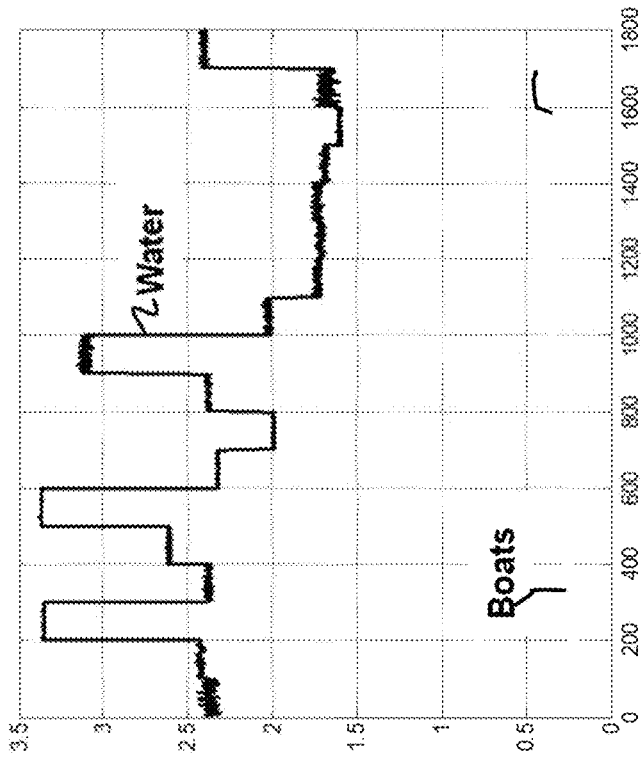
FIG. 9A is an illustration of a comparison of classification for water and boat data vectors using blind sensing.

In FIGS. 9A and 9B, the distance from the prototype boat spectrum for each boat plus water and water only member of the test set was plotted for both blind sensing (as shown in FIG. 9A) and conventional sensing (as shown in FIG. 9B). Here the distances of water and boat data vectors were plotted from their respective prototype used in nearest neighbor classification. Using the same classification algorithm, the classification margin is much higher for blind sensing. The sliding window mixtures for water were collected in areas without boats while the mixtures for boat contained both boat and water components. The water area was 345× larger than the boat area in the boat test set mixtures. A comfortable classification margin for boats versus water was obtained for all test set, members using blind sensing. This was not the case for conventional sensing because there was no threshold value that could have resulted in high recognition and low false alarm rates.

Figures 10A, 10B:
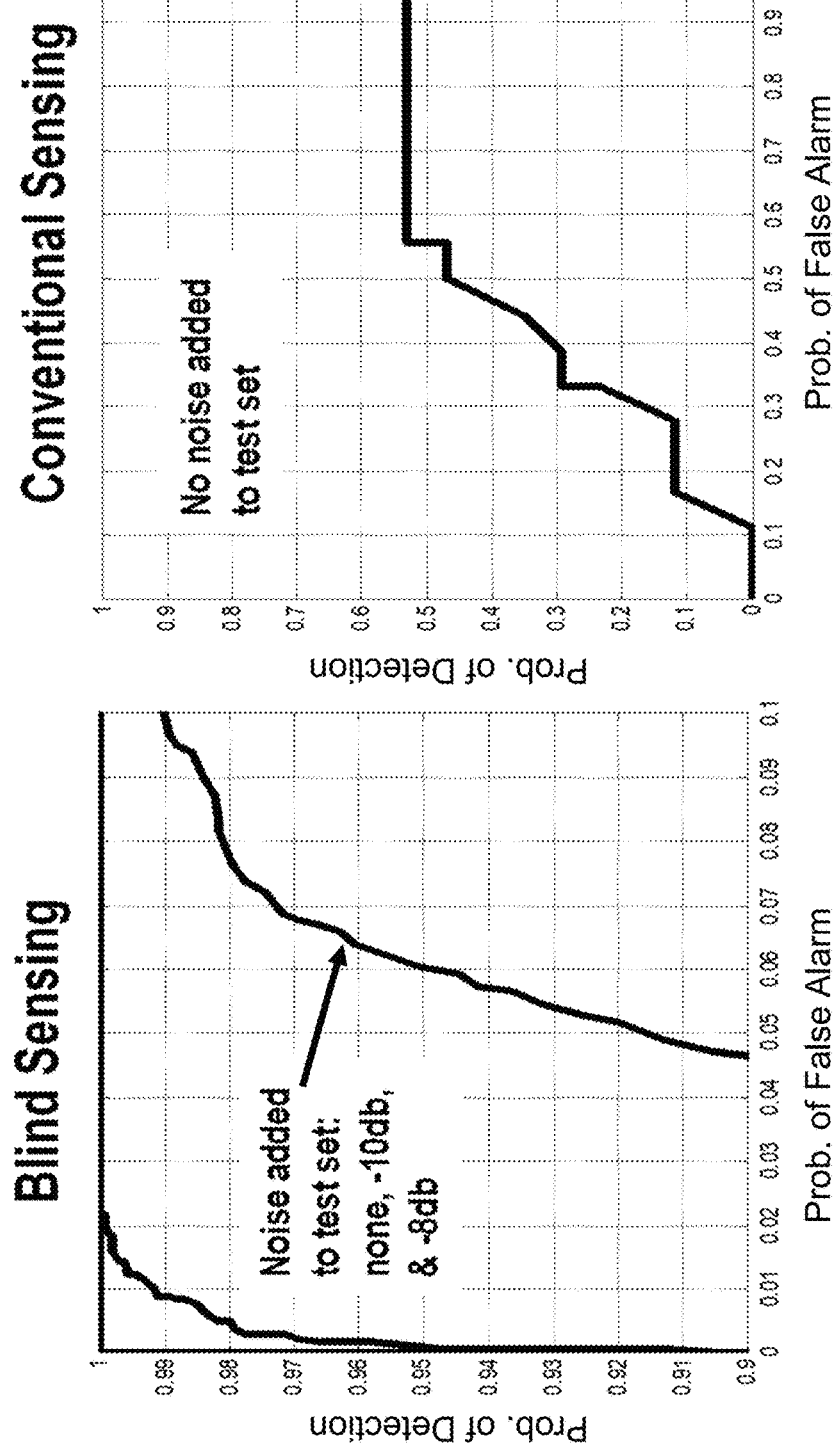
FIG. 10A is an illustration of a nearest neighbor classifier ROC curve for blind sensing.
FIG. 10B is an illustration of a nearest neighbor classifier ROC curve for conventional sensing.

The higher performance of blind sensing is illustrated quantitatively in FIGS. 10A and 10B using ROC curves (plots of probability of correct detection vs probability of false alarm). The ROC curves were generated by varying the classification threshold value for each member of the test set and plotting the average Pdet and Pfa. For this relatively limited Long Beach Harbor dataset, blind sensing achieved perfect performance on the test set using a nearest neighbor classifier with Pdet=100% and Pfa=0. The performance for conventional sensing using the same classifier was about the same as random selection. Note the different scales for the two graphs. As shown in FIG. 10A, in order to test the robustness of blind sensing, noise was added to the test set to see how it degraded the performance. The performance degraded gracefully and still achieved Pdet=98% with Pfa=0.5% for −10 db of additive noise.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A blind sensing system for hyperspectral surveillance, the system comprising:
   one or more processors and a memory, the memory being a non-transitory computer-readable medium having executable instructions encoded thereon, such that upon execution of the instructions, the one or more processors perform operations of:
   forming a signal mixture of a plurality of multi-dimensional signals using a subset of dimensions within the multi-dimensional signals, the multi-dimensional signals being hyperspectral data of a wide area having a background and an object and the subset of dimensions being mixing dimensions;
   demixing the plurality of multi-dimensional signals using blind source separation in dimensions orthogonal from the mixing dimensions, resulting in separated spectra; and
   detecting and recognizing a spectral signature of the object in the separated spectra in dimensions orthogonal from the mixing dimensions.

2. The system as set forth in claim 1, further comprising an operation of tracking the object.

3. The system as set forth in claim 1, wherein the hyperspectral data is captured using a push-broom hyperspectral camera mounted on a mobile platform.

4. The system as set forth in claim 1, wherein in forming the signal mixture, hyperspectral data from a plurality of overlapping sliding windows are integrated.

5. The system as set forth in claim 1, wherein in timing the signal mixture, hyperspectral data from a plurality of overlapping sliding windows are integrated. and wherein the plurality of overlapping sliding windows are slid in space and time.

6. The system as set forth in claim 1, wherein demixing the plurality of multi-dimensional signals is performed using independent component analysis.

7. The system as set forth in claim 1, wherein in forming the signal mixture, hyperspectral data from a plurality of overlapping sliding windows are integrated, and wherein the plurality of overlapping sliding windows are formed using nadir or side-looking views from forward motion of a push-broom hyperspectral camera mounted on a mobile platform.

8. The system as set forth in claim 1, wherein detecting and recognizing the spectral signature of the object in the separated spectra is performed using a technique selected from a group consisting of nearest neighbor classification, support vector machine classification, neural network classification, and decision tree classification.

9. The system as set forth in claim 1, wherein the detected spectral signature of the object provides a cue to cause the system further perform an operation of zooming in on the object with a camera that operates in the mixing dimension.

10. A computer program product for blind sensing hyperspectral surveillance, the computer program product comprising:
   a non-transitory computer-readable medium having executable instructions encoded thereon, such that upon execution of the instructions by one or more processors, the one or more processors perform operations of:

forming a signal mixture of a plurality of multi-dimensional signals using a subset of dimensions within the multi-dimensional signals, the multi-dimensional signals being hyperspectral data of a wide area having a background and an object and the subset of dimensions being mixing dimensions;

demixing the plurality of multi-dimensional signals using blind source separation in dimensions orthogonal from the mixing dimensions, resulting in separated spectra; and detecting and recognizing a spectral signature of the object in the separated spectra in dimensions orthogonal from the mixing dimensions.

11. computer program product as set forth in claim 10, further comprising an operation of tracking the object.

12. The computer program product as set forth in claim 10, wherein the hyperspectral data is captured using a push-broom hyperspectral camera mounted on a mobile platform.

13. The computer program product as set forth in claim 10, wherein in forming the signal mixture, hyperspectral data from a plurality of overlapping sliding windows are integrated.

14. The computer program product as set forth in claim 10, wherein in forming the signal mixture, hyperspectral data from a plurality of overlapping sliding windows are integrated, and wherein the plurality of overlapping sliding windows are slid in space and time.

15. The computer program product as set forth in Claim 10, wherein demixing the plurality of multi-dimensional signals is performed using independent component analysis.

16. The computer program product as set forth in claim 10, wherein in forming the signal mixture, hyperspectral data from a plurality of overlapping sliding windows are integrated, and wherein the plurality of overlapping sliding windows are formed using nadir or side-looking views from forward motion of a push-broom hyperspectral camera mounted on a mobile platform.

17. The computer program product as set forth in claim 10, wherein detecting and recognizing the spectral signature of the object in the separated spectra is performed using a technique selected from a group consisting of nearest neighbor classification, support vector machine classification, neural network classification, and decision tree classification.

18. The computer program product as set forth in claim 10, wherein the detected spectral signature of the object provides a cue to cause the one or more processors to further perform an operation of zooming in on the object with a camera that operates in the mixing dimension.

19. A method for blind sensing hyperspectral surveillance, the method comprising an act of:

causing one or more processors to execute instructions encoded on a non-transitory computer-readable medium, such that upon execution, the one or more processors perform operations of:

forming a signal mixture of a plurality of multi-dimensional signals using a subset of dimensions within the multi-dimensional signals, the multi-dimensional signals being hyperspectral data of a wide area having a background and an object and the subset of dimensions being mixing dimensions;

demixing the plurality of multi-dimensional signals using blind. source separation in dimensions orthogonal from the mixing dimensions, resulting in separated spectra; and detecting and recognizing a spectral signature of the object in the separated spectra in dimensions orthogonal from the mixing dimensions.

20. The method as set forth in claim 19, further comprising an operation of tracking the object.

21. method as set forth in claim 19, wherein the hyperspectral data is captured using a push-broom hyperspectral camera mounted on a mobile platform.

22. The method as set forth in claim 19, wherein in forming the signal mixture, hyperspectral data from a plurality of overlapping sliding windows are integrated.

23. The method as set forth in claim 19, wherein in forming the signal mixture, hyperspectral data from a plurality of overlapping sliding windows are integrated, and wherein the plurality of overlapping sliding windows are slid in space and time.

24. The method as set forth in claim 19, wherein demixing the plurality of multi-dimensional signals is performed using independent component analysis.

25. The method as set forth in claim 19, wherein in forming the signal mixture, hyperspectral data from a plurality of overlapping sliding windows are integrated, and wherein the plurality of overlapping sliding windows are formed using nadir or side-looking views from forward motion of a push-broom hyperspectral camera mounted on a mobile platform.

26. The method as set forth in claim 19, wherein detecting and recognizing the spectral signature of the object in the separated spectra is performed using a technique selected from a group consisting of nearest neighbor classification, support vector machine classification, neural network classification, and decision tree classification.

27. The method as set forth in claim 19, wherein the detected spectral signature of the object provides a cue to cause the one or more processors to further perform an operation of zooming in on the object with a camera that operates in the mixing dimension.

* * * * *